Patented Apr. 18, 1939

2,154,912

UNITED STATES PATENT OFFICE 2,154,912

PRODUCTION OF DYESTUFFS OF THE PHTHALOCYANINE SERIES

Fritz Muehlbauer and Georg Niemann, Ludwigshafen-on-the-Rhine, Germany, assignors to General Aniline Works, Inc., New York, N. Y., a corporation of Delaware No Drawing. Application December 29, 1936, Serial No. 118,120. In Germany January 4, 1936

4 Claims. (Cl. 260—319)

The present invention relates to a process of producing dyestuffs of the phthalocyanine series.

We have found that dyestuffs of the phthalocyanine series can be advantageously prepared by heating dinitriles of aromatic ortho-dicarboxylic acids, or compounds capable of conversion into such dinitriles, in the presence of cyanamides. Mixtures of the said dinitriles may also be used.

Since the reaction usually proceeds very vigorously, it is preferably carried out in the presence of a solid diluent which does not take part in the reaction, for which purpose there may be used for examples salts of the alkali and alkaline earth metals, silicon dioxide in various forms, titanium dioxide and aluminium oxide. If the reaction be carried out in the presence of a metal or metal compound, the metal of which is capable of entering into the dyestuff, the corresponding dyestuffs containing metal are obtained. In these cases, even small amounts of the cyanamide are usually sufficient to effect the reaction. If, besides the metal cyanamide, no other metal compound is used, the resulting dyestuff contains the metal of the metal cyanamide. If this metal is an alkali metal, it may be split off in known manner by a suitable aftertreatment such as washing with methanol or redissolution from sulphuric acid.

A great variety of cyanamides may be used. Suitable cyanamides are for example the cyanamides of the alkali and alkaline earth metals and lead cyanamide. Generally speaking the reaction is carried out by first preparing a melt of the aromatic ortho-dicarboxylic acid dinitrile or the corresponding compound capable of conversion into the same or a corresponding mixture and any solid diluent used and if desired a metal or metal compound, and then introducing the finely powdered cyanamide into this melt. The reaction thereby takes place very soon and proceeds rapidly to completion. The cyanamide may also be added to the reaction mixture from the start. The reaction proceeds best at a temperature above the melting point of the dinitrile, compound or mixture of compounds behaving as a dinitrile used.

The process according to this invention is distinguished by the facts that the reaction proceeds in a very short time and usually very completely and that the dyestuffs are obtained in a pure state.

The following examples will further illustrate how the said invention may be carried out in practice, but the invention is not restricted to these examples. The parts are by weight.

Example 1

An intimate mixture of 30 parts of phthalodinitrile and 5.6 parts of sodium cyanamide is heated for about an hour at from 200° to 250° C. After cooling, the resulting dyestuff is separated by boiling the pulverized reaction mass with dilute hydrochloric acid. The product is obtained in a finely divided state by dissolution in concentrated sulphuric acid, pouring the solution onto ice and if desired by treatment with dispersing agents.

Example 2

An intimate mixture of 50 parts of phthalodinitrile, 18.6 parts of sodium cyanamide and 25 parts of sodium chloride is prepared in a ball mill and is then heated for about an hour at 250° C. The mass is allowed to cool, is comminuted and then introduced into hot dilute hydrochloric acid and the mixture boiled. The dyestuff is filtered off and washed thoroughly. It may be brought into a state of fine dispersion in the manner described in Example 1.

Example 3

A mixture of 150 parts of phthalodinitrile, 25 parts of sodium cyanamide and 7 parts of magnesium powder is heated for an hour at 250° C. The resulting mass is worked up in the manner described in the foregoing examples. By dissolving the dyestuff containing magnesium in, and precipitating it from, concentrated sulphuric acid, a dyestuff free from metal is obtained in a finely divided form.

Example 4

A mixture of 150 parts of phthalodinitrile, 12.5 parts of sodium cyanamide and 25.5 parts of magnesium oxide is heated for two hours at about 300° C. By boiling with dilute hydrochloric acid, thorough washing with hot water and dissolution in, and precipitation from, concentrated sulphuric acid, the pure dyestuff free from metal is obtained in a finely divided form.

Example 5

25 parts of zinc chloride are introduced into a melt of 50 parts of phthalodinitrile which is at a temperature of about 165° C. About 5 parts of finely powdered sodium cyanamide are then added. The reaction commences immediately and the melt solidifies. The dyestuff thus obtained is separated in the manner described in the foregoing examples.

Example 6

A mixture of equal parts of phthalodinitrile and calcium cyanamide is heated for about two hours at 300° C. The dyestuff thus obtained is obtained in a pure state in the manner described in the foregoing examples.

Example 7

An intimate mixture of 120 parts of phthalodinitrile and 100 parts of lead cyanamide is heated for about 90 minutes at 250° C. The green lead compound is thus obtained in a good yield. It is purified by thorough boiling with dilute hydrochloric acid and washing with hot water.

The reaction proceeds somewhat less vigorously when a mixture of 50 parts of phthalodinitrile, 50 parts of lead cyanamide and 25 parts of sodium chloride is heated for 90 minutes at 250° C. The yield is just as good as when proceeding as described in the first paragraph of this example.

Example 8

A mixture of 50 parts of phthalimide or ortho-cyanobenzamide and 50 parts of lead cyanamide is heated for an hour at 250° C. The resulting mass is pulverized, boiled with dilute hydrochloric acid, the dyestuff filtered off by suction and washed thoroughly with hot water.

What we claim is:

1. A process of producing dyestuffs of the phthalocyanine series which comprises heating an aromatic dinitrile with sodium cyanamide and separating the dyestuffs formed from any inorganic substances.

2. A process of producing dyestuffs of the phthalocyanine series which comprises heating an aromatic dinitrile with calcium cyanamide and separating the dyestuffs formed from any inorganic substances.

3. A process of producing dyestuffs of the phthalocyanine series which comprises heating phthalodinitrile with sodium cyanamide and separating the dyestuffs formed from any inorganic substances.

4. A process of producing dyestuffs of the phthalocyanine series which comprises heating an aromatic dinitrile with a cyanamide selected from the group consisting of alkali and earth alkali metal cyanamides, and separating the dyestuff formed from any inorganic substances.

FRITZ MUEHLBAUER.
GEORG NIEMANN.